Dec. 8, 1959     C. PETTERSON     2,916,632
MEANS FOR CONTROLLING THE POSITION OF A RADIATING BODY
Filed May 2, 1957
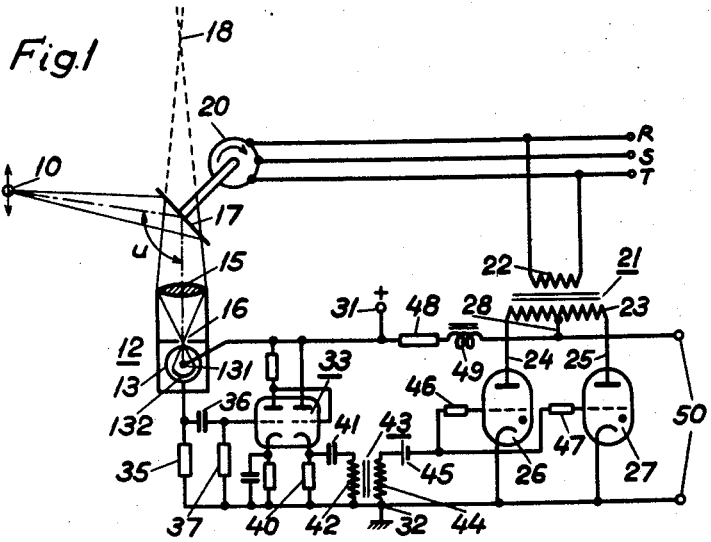
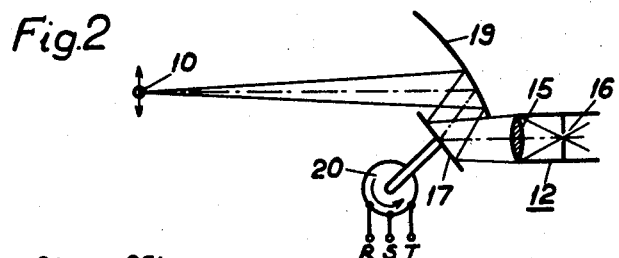
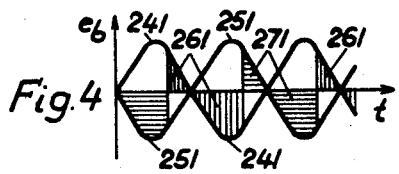
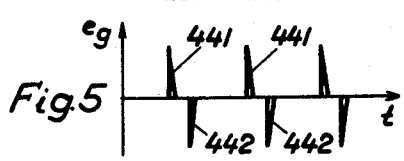
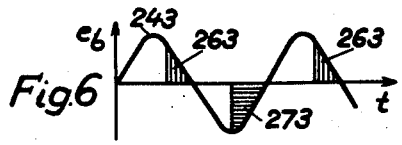
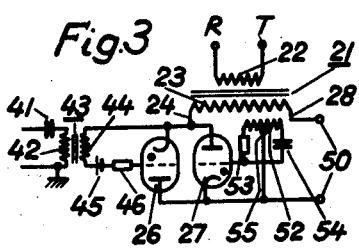
Inventor
Carl Petterson
By
Attorney.

United States Patent Office 2,916,632
Patented Dec. 8, 1959

2,916,632

MEANS FOR CONTROLLING THE POSITION OF A RADIATING BODY

Carl Petterson, Vasteras, Sweden, assignor to Allmanna Svenska Elektriska Aktiebolaget, Vasteras, Sweden, a corporation of Sweden Application May 2, 1957, Serial No. 656,698

Claims priority, application Sweden May 5, 1956

5 Claims. (Cl. 250—219)

This invention relates to a means for controlling the position of a radiating body, such as a hot rod or strip in a rolling mill, especially for automatic loop regulation.

In automatic loop regulators for hot strip mills the dimension of the loop has hitherto been controlled by means of a potentiometer, the moving contact of which was influenced by a lever with a roller touching the hot strip. A controlling device of this sort must be arranged at the floor of the mill, where it is severely exposed to damage, and further require mechanical contact between the feeling roller and the strip, which in certain cases is objectionable, e.g. when the hot strip is very weak.

It is the main object of the invention to provide a loop regulator having no feeling means in mechanical contact with the hot strip.

It is a further object of the invention to provide a means for controlling the position of any body emitting a radiation detectable by electronic means, such as photoelectric cells.

Another object of the invention is to provide a means for controlling the position of the loop in a hot rolling mill working on photoelectric principles but avoiding the disadvantages inherent in ordinary photoelectric devices, viz. large dependence on ageing of the photoelectric cell, the vacuum tubes and other components of the device.

Also among the objects is the provision of a photoelectric sensing means for an automatic loop regulator having a large working range, so that no precautions need be taken to make the sensing means seek out the hot strip when the means is put into service and occassional disturbances cannot cause the loop regulator to run wild.

A means according to the invention is characterized in that it utilizes a photoelectric scanning device comprising a photoelectric cell having a narrow field of view, which is arranged to periodically scan across the said radiating body, and by a static converter being controlled by pulses derived from the output voltage of said photoelectric scanning device and being fed by an alternating voltage which is synchronous with said periodic scanning process.

Every time the field of view of the photoelectric cell passes an edge of the hot rod or strip, the light or heat radiation received gives rise to a sudden change in the output voltage of the photoelectric scanning device. This voltage change is amplified and fed as an ignition pulse to the static converter, so that the retardation angle of the converter depends on the instant of occurrence of the sudden change. In this way the direct current output voltage of the converter will depend on the position of the hot rod or strip so that it may be utilized for controlling the position of the strip, e.g. by influencing the speed of the rolling motors in the case of loop regulation.

For a more detailed explanation of the invention and for further objects and advantages thereof, reference may now be had to the following description taken in conjunction with the drawing, in which:

Fig. 1 shows a preferred form of the invention, Figs. 2 and 3 show differing forms of the optical system and the converter part respectively of the arrangement shown in Fig. 1, and Figs. 4–6 show the voltage as a function of time in different parts of the arrangement according to Figs. 1 and 3.

In Fig. 1 the numeral 10 designates a cross section through a body which is lighter or hotter than the surrounding and is movable in the direction of the arrows, e.g. the hot strip passing a loop in a continuous rolling mill. 12 is a photoelectric scanning device comprising a photo-emissive cell 13, the anode 131 of which is connected to the positive terminal 31 of a direct current source, and the cathode 132 of which in series with a high-ohmic resistor 35 is connected to the grounded negative terminal 32 of the same direct current source. The cathode 132 is illuminated through a narrow slit 16 and a lens 15, which produces an image 18 of the slit 16 and thus limits the field of view of the photoelectric cell to what is embraced between the dotted lines through the slit image 18.

A rotating mirror 17 is arranged in the field of view of the photoelectric scanning device 12 so that it deflects the field of view to a different degree dependent on which angle it forms with the optical axis of the photoelectric cell. The mirror 17 is driven by a synchronous motor 20 connected to an alternating current source having phase terminals RST. The slit image 18 will thus move periodically along a circle concentric with the shaft of the mirror 17 so that the field of view of the photoelectric scanning means 12 scans past the radiating body 10 once during each turn of the mirror 17. According to Fig. 1 the lens 15 is adjusted in such a way that the circle followed by the slit image 18 touches the radiating body 10, which means that the body 10 is imaged in the surface of the slit when the mirror 17 passes the position shown. This adjustment of the lens 15 gives maximum sensitivity but is not necessary for the correct operation of the device.

As the cathode 132 of the photoelectric cell 13 is more illuminated when the body 10 lies within the field of view of the photoelectric scanning device 12 than during the rest of the movement of the mirror 17, short voltage pulses will arise across the resistor 35 synchronously with the rotation of the mirror 17. The sudden voltage changes at the beginning and the end of these pulses are fed through a capacitor 36 to a grid resistor 37 in a two stage vacuum tube amplifier consisting of a double triode 33 with appurtenant components. The left system of the double triode 33 works as a resistance coupled voltage amplifier, while the right hand system works as a cathode follower on a cathode resistor 40. Both systems in the double triode 33 are connected to the direct current source feeding the photoelectric cell 13.

From the cathode resistor 40 the amplified voltage pulses are fed through a capacitor 41 to the primary winding 42 in a transformer 43 having a secondary winding 44 connected between the grids and the interconnected cathodes of two thyratrons 26, 27. The anodes of the thyratrons are connected to the end terminals 24, 25 of a secondary winding 23 in a transformer 21, the primary winding 22 of which is connected to the phase terminals RT of the alternating current source feeding the synchronous motor 20. Two output terminals 50 are connected to the interconnected cathodes and a center tap 28 in the secondary winding 23, respectively. A direct current source 31, 32 is connected to the output terminals 50 in series with a resistor 48 and a reactor 49. According to Fig. 1 this direct current source 31, 32 supplies even the photoelectric cell 13 and the double triode 33, but it is often advantageous to provide separate direct current sources. The grids of the thyratrons 26, 27 and the winding 44 in the transformer 43 are series connected with grid resistors 46, 47 and a source of bias voltage 45, which make the grids sufficiently negative to prevent firing of the thyratrons 26, 27 until a positive voltage arises across the winding 44.

Through a suitable dimensioning of the capacitors 36 and 41 as well as the transformer 43 the voltage across the secondary winding 44 may be made proportional to the rate of change of the voltage across the cathode resistor 35 of the photoelectric cell 13 in which case the voltage across the winding 44 will have the form shown in Fig. 5 where the abscissa represents time $t$ and the ordinate represents voltage $e_g$. The positive pulses 441 shown in Fig. 5 arise when the radiating body 10 enters the field of view of the photoelectric scanning device 12 and the negative pulses 442 arise when the body 10 leaves the field of view. The distance between a positive pulse 441 and the corresponding negative pulse 442 depends partly on the extension of the body 10 in the direction of movement of the field of view, and partly on the extension of the field of view adjacent the body 10, while the distance between two positive pulses corresponds directly to one turn of the mirror 17 if the mirror is single-sided, or half a turn if the mirror 17 is double-sided.

The thyratrons 26, 27 constitute together with the transformer 21 a static converter, the mode of operation of which is illustrated in Fig. 4 where the abscissa represents time $t$ in the same scale as in Fig. 5 and the ordinate represents voltage $e_b$. The sinusoids 241 and 251 represent the voltage between the center tap 28 and the end terminals 24, 25, respectively, of the secondary winding 23, feeding the thyratrons, and the hatched parts 261 and 271 represent the intervals when the thyratrons 26, 27, respectively, are conducting. In Figs. 4 and 5 it is presupposed that two positive pulses occur at the grids of the thyratrons 26, 27 during each period of the main voltage in the converter, which is the case when the mirror 17 is double-sided and the synchronous motor 20 has one pair of poles.

At the beginning of the process illustrated in Fig. 4 the thyratron 27 conducts in spite of the alternating anode voltage 251 of this thyratron being negative, because the direct current source 31, 32 supplies current in the conducting direction of the thyratron 27. Some time after the passage of the amplitude value of the alternating anode voltage 241 of the thyratron 26 a positive voltage pulse 441 arises across the winding 44 and is fed to the grids of both thyratrons 26, 27. As the alternating anode voltage 241 of the thyratron 26 is more positive than the alternating anode voltage 251 of the thyratron 27, the thyratron 26 ignites and a voltage equal to the difference between the alternating anode voltages 241 and 251 is impressed on the thyratron 27 in the inverse direction. The thyratron 27 thus is extinguished when the thyratron 26 ignites, which means that the pulse 441 only causes the thyratrons 26 and 27 to interchange their functions. The thyratron 26 will now conduct for half a period, the direct current source 31, 32 supplying the anode current when the alternating anode voltage 241 is negative. Then another positive pulse 441 again makes the thyratrons 26, 27 interchange their functions. The negative pulses 442 from the transformer winding 44 do not influence the thyratrons 26, 27 and are of no importance for the mode of operation of the device.

The converter delivers a direct voltage between the output terminals 50 which equals the difference between the hatched areas above and below the abscissae in Fig. 4 and which thus is determined by the phase of the voltage pulses 441 in relation to the main voltage of the converter. From Figs. 4 and 5 it will be seen that the output voltage equals zero when the voltage pulses 441 occur 90° after the zero passage of the main voltage. When they occur earlier the output voltage is positive and the converter works as a rectifier and when they occur later the output voltage is negative, which means that the converter works as inverter passing energy from the direct current source 31, 32 to the alternating current source RST. When the voltage pulses move 180° electrical degrees relative to the main voltage the output voltage varies sinusoidally between a positive peak value equal to the total rectified mean value of the alternating anode voltage and an equal but negative peak value.

Because the main voltage of the converter equals the terminal voltage of the synchronous motor 20 it is synchronous with the rotation of the mirror 17, so that each angle formed between the mirror 17 and the optical axis of the lens 15 corresponds to a certain phase angle in the main voltage of the converter. The voltage pulses 441 arise, as previously explained, when the mirror 17 is in such a position that the radiating body 10 enters the field of view of the photoelectric cell 13, and the output voltage of the converter is thus unambiguously determined by the angle $u$ between the optical axis of the lens 15 and a line connecting the shaft of the mirror 17 and the boundary line of the body 10. The arrangement according to Fig. 1 thus is able to supply an electrical voltage which is a measure of a space coordinate of the body 10 and provides thereby a power which is limited only by the working load of the converter.

Because the output voltage changes its polarity when the angle $u$ has a certain value, the output voltage is well suited as control voltage in an automatic position controller. When the device for instance is utilized as a loop regulator in a hot strip mill the output voltage from the terminals 50 of the converter may after smoothing be added to the reference voltage determining the speed of the roll stands following the loop. The speed of this roll stand then will adjust itself to such a value that the hot strip remains close to that position which corresponds to zero voltage between the terminals 50 of the converter. The working point of the regulator may easily be changed by moving the photoelectric scanning device 12 or through turning the stator of the synchronous motor 20.

It will be seen from Fig. 1 that the measuring range of the device is substantially 360°, except for only those parts where the thickness of the mirror 17 and the diameter of the lens 15 limits the field of view. Because of the large measuring range of the device, the function is not disturbed by occasional interruptions in the measurement caused by interruptions in the anode voltage or by disappearance of the radiating body 10, e.g. breaks in the hot strip 10 when the arrangement is utilized as a loop regulator. As soon as the operation has been restored the arrangement shown in Fig. 1 always supplies the correct output voltage and no special precautions need be taken to make the photoelectric cell seek out the body 10 when the device is put into service.

As the output voltage from the device is determined by the instant of occurrence of the pulses 441 and not by their magnitude it is within wide limits independent of the sensitivity of the photocell 13 as well as the gain of the vacuum tube amplifier (33). Ageing of the photoelectric cell and the vacuum tube thus does not influence the exactness of the device.

In cases when the distance between the body 10 and the photoelectric scanning device has to be very large, the sensitivity of the device may be improved by purely optical means. One form of such an improved device is shown in Fig. 2, in which the electrical part of the device is supposed to be equivalent to that shown in Fig. 1. The optical system illustrated in Fig. 2 differs from that described above only in that a parabolic mirror 19 is arranged between the body 10 and the rotating mirror 17 in such a way that the shaft of the rotating mirror 17 coincides with the focal point of the parabola 19. It is well known that a parabolic mirror deflects every light ray through its focal point so that it after reflection becomes parallel to the axis of the parabola. The field of view of the photoelectric cell 13 will thus in the arrangement according to Fig. 2 after reflection in the rotating mirror 17 and the parabolic mirror 19, move perpendicularly to the axis of the parabolic mirror. The change in phase of the pulses from the photoelectric scanning device produced by a certain displacement of the body 10 will thus in this case be independent of the distance between the scanning device and the body 10 in contrast to the device according to Fig. 1 which has a decreasing sensitivity with increasing distance between the photoelectric cell and the radiating body. The parabolic mirror 19 thus increases the angle of view of the photoelectric scanning device in the same way as the objective in a telescope. In the device according to Fig. 2 the output voltage from the converter may further be made an exact function of the displacement of the body 10 solely by choosing a suitable working point for the converter.

A simplified form of the static converter part of the measuring device according to Fig. 1 is shown in Fig. 3. Even here two thyratrons 26 27 are utilized, but only one of them, 26, is influenced by the voltage pulses from the photoelectric scanning device. The retarding angle of the thyratron 27 is fixed at 90° by means of a phase shifting device connected between the grid and the cathode. The phase shifting device comprises a winding 52 with a center tap 55 in the anode voltage transformer 21 and a resistor 53 and a capacitor 54. The thyratrons 26, 27 are connected in antiparallel and are connected to the output terminals 50 in series with the secondary winding 23 in the anode voltage transformer 21. The mode of operation is illustrated in Fig. 6 in which the abscissae represents time $t$ in the same scale as in Figs. 4 and 5 and the ordinate represents voltage $e_b$ in the same scale as in Fig. 4. The sinusoid 243 represents the potential of the end terminal 24 of the secondary winding 23 and the areas 263 and 273 represent the intervals when the thyratrons 26 and 27, respectively, are conducting.

As the thyratrons 26, 27 are antiparallel they are conducting only during each one half period of the alternating anode voltage, and the voltage across the output terminals 50 have the same form as the hatched parts 263 and 273 of the anode voltage graph 243. The area 273 is constant because of the fixed retarding angle of the thyratron 27 and the mean value of the output voltage thus varies with the retarding angle of the thyratron 26. If the pulses 441 occur 90° after the zero passage of the alternating anode voltage, the area 263 equals the area 273 so that the mean value of the output voltage equals zero. When the pulses 441 occur earlier the output voltage becomes positive, and when they occur later the output voltage becomes negative. The function of the arrangement according to Fig. 1 thus remains unchanged when the static converter part is replaced by the static converter part shown in Fig. 3. A comparison between Figs. 4 and 6 shows that the first converter part produces a larger voltage difference across the output terminals 50 than the latter for a certain displacement of the controlled body 10. The arrangement according to Fig. 3 is, however, advantageous in that it is independent of any separate direct current source (31, 32) and in that its output voltage is substantially independent of the arc-drop in the thyratrons 26, 27. Further the working point of the arrangement according to Fig. 3 may be changed by changing the fixed retarding angle of the thyratron 27, e.g. through changing the resistor 53, so that mechanical adjustments necessary to change the working point of Fig. 1 may be avoided.

From Figs. 5 and 6 it will be evident that every second of the pulses 441 is superfluous as it occurs when the thyratron 26 has inverse voltage. These superfluous pulses may easily be avoided by making the mirror 17 single-sided, but it is better to make the mirror 17 instead rotate at half speed, for instance by doubling the number of poles in the synchronous motor 20. This doubles the electrical angle between the pulses 441 without changing the mechanical angle measured, which means that the sensitivity of the arrangement is increased to the same degree. Quite generally the static converter will be optimally utilized when the number of control pulses 441 during one period of the main voltage equals the number of controlled phases in the converter.

The examples illustrate preferred forms of the invention but many variations of them also fall within the scope of the invention. As an example the photoelectric cell needs not be a photo-emissive cell as shown, but a photoresistive cell such as a heat sensitive lead sulphide cell is often advantageous. The inertia in a cell of this sort appears only as a constant phase delay and is harmless when the main voltage of the static converter is of constant frequency. The design of the static converter may be varied within wide limits and the wanted change in the polarity of the output voltage may of course be obtained simply by connecting a fixed voltage in series with the output voltage of the controlled converter.

I claim as my invention:

1. In a means for controlling the position of a radiating body such as a loop in a hot strip mill, a radiation sensitive scanning means having a narrow field of view performing a periodic scanning motion across said body, an electrical property in said scanning means undergoing sudden changes each time said field of view passes an edge of said radiating body, a controllable static converter having output terminals and being fed with an alternating voltage, and comprising control means responsive to the instant of occurrence of periodic control pulses and producing a direct current output voltage continuously dependent on the instant of occurrence of said control pulses, measured in phase angle of said alternating voltage, means for synchronizing said periodic scanning motion and said alternating voltage, means for deriving control pulses from said sudden changes in said electrical property in said scanning means, and means for impressing said control pulses on said control means in said converter, whereby said direct current output voltage depends on the position of said body.

2. In a means as claimed in claim 1, a source of direct current having a considerable internal impedance shunting said output terminals of said converter.

3. In a means as claimed in claim 1, a second static converter being connected to said output terminals providing a bias voltage between said output terminals.

4. In a means as claimed in claim 1, said radiation sensitive scanning means comprising a synchronous motor driving a rotating mirror, which impresses said periodic scanning motion on said field of view of said photoelectric scanning means, said synchronous motor being fed with said alternating voltage feeding said static converter.

5. In a means as claimed in claim 1, said photoelectric scanning means comprising a parabolic mirror increasing the angle of view of said scanning means.

References Cited in the file of this patent

UNITED STATES PATENTS

| 2,169,818 | Scott | Aug. 15, 1939 |
| 2,444,261 | Kelling | June 29, 1948 |
| 2,497,042 | Doll | Feb. 7, 1950 |
| 2,548,590 | Cook | Apr. 10, 1951 |
| 2,640,137 | Ketchledge | May 26, 1953 |
| 2,812,447 | MacMartin | Nov. 5, 1957 |